(12) United States Patent
Hautson et al.

(10) Patent No.: US 12,429,990 B2
(45) Date of Patent: Sep. 30, 2025

(54) ELECTRONIC DEVICE COMPRISING MAGNETOMETERS

(71) Applicant: ADVANCED MAGNETIC INTERACTION, AMI, Seyssinet Pariset (FR)

(72) Inventors: Tristan Hautson, Seyssinet Pariset (FR); Clement Rosset, Seyssinet Pariset (FR); Jean-Luc Vallejo, Seyssinet Pariset (FR); Vincent Thomas Pellerano, Seyssinet Pariset (FR); Timothée Jobert, Seyssinet Pariset (FR)

(73) Assignee: ADVANCED MAGNETIC INTERACTION, AMI, Seyssinet Pariset (FR)

( * ) Notice: Subject to any disclaimer, the term of this patent is extended or adjusted under 35 U.S.C. 154(b) by 0 days.

(21) Appl. No.: 18/647,723

(22) Filed: Apr. 26, 2024

(65) Prior Publication Data
US 2024/0361873 A1 Oct. 31, 2024

(30) Foreign Application Priority Data

Apr. 28, 2023 (EP) .................................... 23170850

(51) Int. Cl.
*G06F 3/046* (2006.01)
*G01B 7/04* (2006.01)
*G06F 3/0354* (2013.01)

(52) U.S. Cl.
CPC ............. *G06F 3/046* (2013.01); *G01B 7/046* (2013.01); *G06F 3/03545* (2013.01); *G06F 2203/04101* (2013.01)

(58) Field of Classification Search
CPC ...... G06F 3/03545; G06F 3/013; G06F 1/163; G06F 3/011
See application file for complete search history.

(56) References Cited

U.S. PATENT DOCUMENTS 9,507,443 B2    11/2016  Hauston et al.
2002/0134594 A1*  9/2002  Taylor .................. G06F 3/0354
                                              324/207.17
(Continued)

OTHER PUBLICATIONS

Extended European Search Report issued in EP 23170850.4, mailed Oct. 17, 2023.

*Primary Examiner* — Van N Chow
(74) *Attorney, Agent, or Firm* — Bookoff McAndrews, PLLC

(57) ABSTRACT

An electronic interactive device includes an interaction surface for use with a user borne device. The interaction surface includes a contact detection surface for detecting a device contact event with the interaction surface; a plurality of magnetometers defining a reference coordinate system and a sensing volume proximate to the interaction surface, with each of the magnetometers having a rigid spatial relationship to the other magnetometers; and processing circuitry communicably coupled to at least the contact detection surface and the plurality of magnetometers. The plurality of magnetometers perform magnetic field measurements and provide measurement data to the processing circuitry. The processing circuitry determines at least one of position and/or magnet orientation relative to a longitudinal axis of the user borne device and a distance separating the magnet and/or magnet orientation relative to a longitudinal axis of the user borne device from the interaction surface when the contact event occurs.

20 Claims, 8 Drawing Sheets

(56) References Cited

U.S. PATENT DOCUMENTS

| | | | |
|---|---|---|---|
| 2013/0009907 A1 | 1/2013 | Rosenberg et al. | |
| 2013/0218516 A1* | 8/2013 | Yu .......................... | G06F 3/046 |
| | | | 702/150 |
| 2014/0362057 A1* | 12/2014 | Hautson ................ | B43K 29/08 |
| | | | 345/179 |
| 2015/0084915 A1* | 3/2015 | Hautson .................. | G06F 3/046 |
| | | | 345/174 |

* cited by examiner

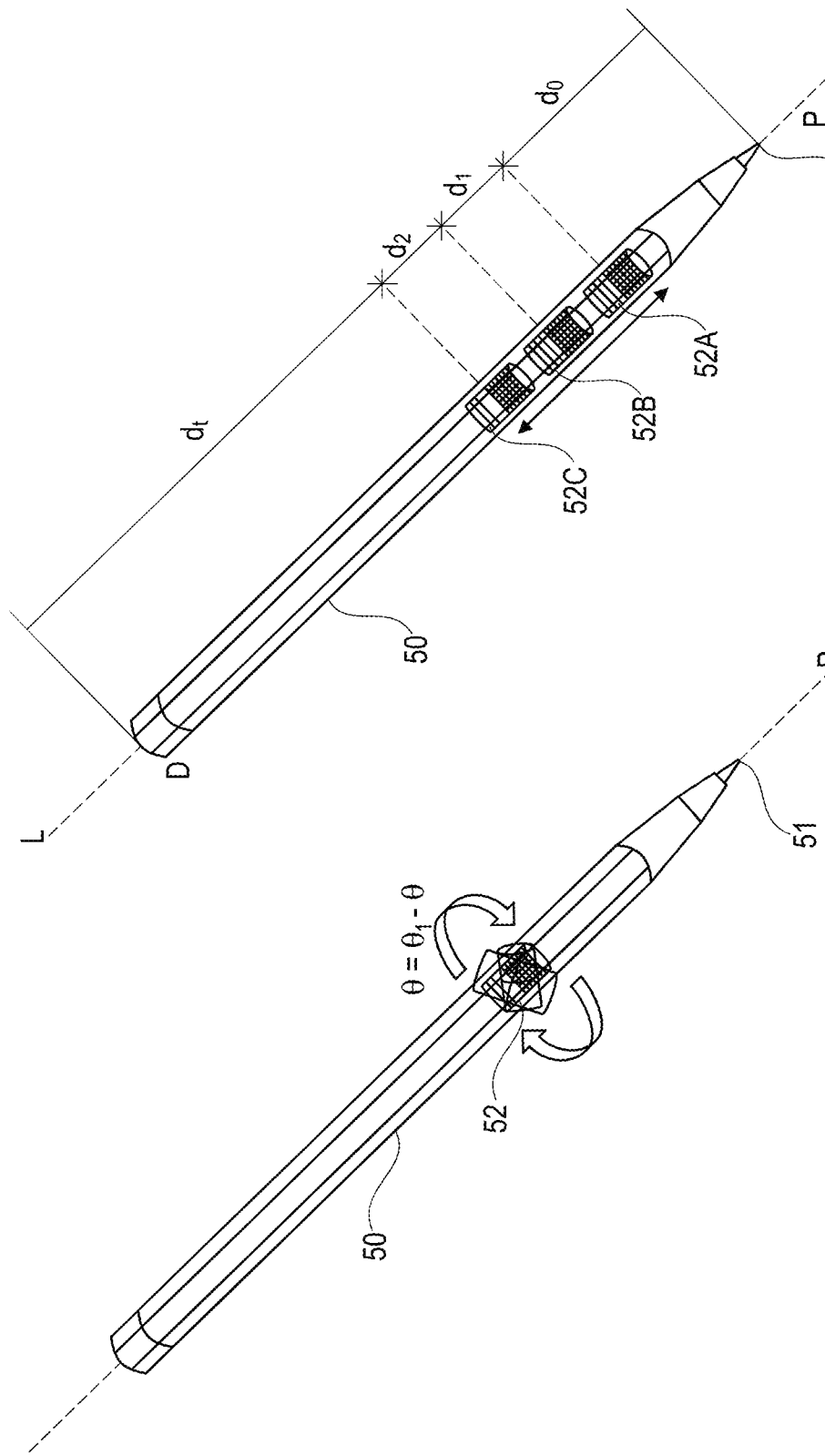

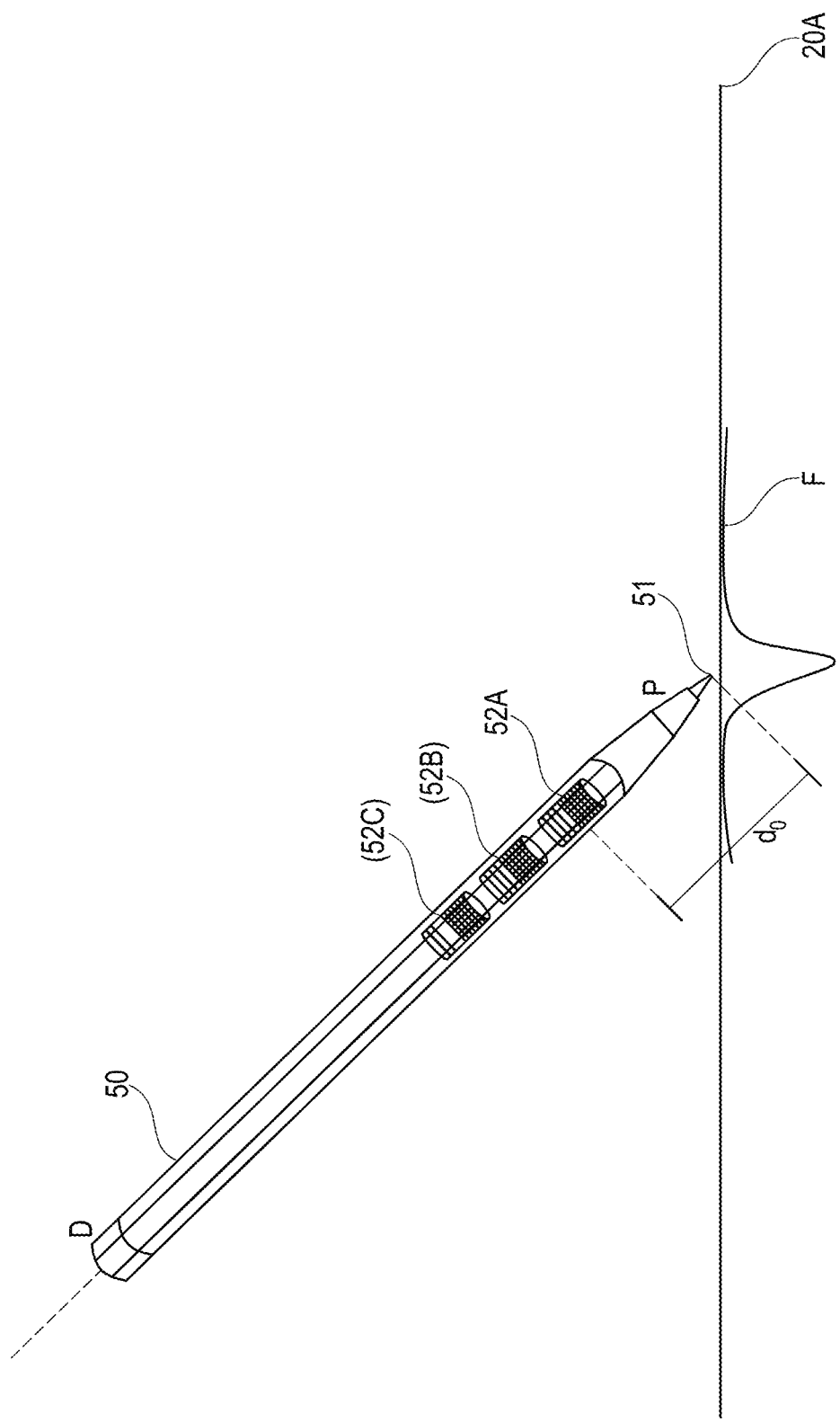

ELECTRONIC DEVICE COMPRISING MAGNETOMETERS

CROSS-REFERENCE TO RELATED APPLICATIONS

This application claims benefit from European Patent Application No. 23170850.4, filed on Apr. 28, 2023, its content being incorporated herein by reference.

TECHNICAL FIELD

The present disclosure concerns an electronic interactive device and an associated computer implemented method, system, and computer program element.

BACKGROUND

Electronic interactive devices enable a user to write or draw on a visible surface using a user borne device such as a stylus. Typically, a representation of what the user has written or drawn remains persists on the visible surface of the electronic interactive display when the user withdraws the user borne device from the stylus, although sometimes the electronic interactive device does not have an integrated display and instead acts as a peripheral for input to another device such as a computer. Furthermore, processing circuitry within the electronic interactive display may capture and save representations of the writing or drawing that the user has applied to the electronic interactive device.

An example of an electronic interactive display is, for example, an electronic interactive display such as a smart tablet. In a drawing mode of the electronic interactive display, a user may load a drawing application hosted by the electronic tablet. The electronic tablet detects the location of touch of a user's finger or stylus using a mutual capacitance arrangement embedded in the screen of the electronic tablet. The electronic interactive display digitizes the location of touch of the user's finger or stylus, and provides the digitised location to the drawing application via a device driver.

When using electronic drawing applications, it is often intended to change the drawing mode of the pen. This is typically achieved using a menu bar of the software drawing application, either by tapping a palette displayed on a software menu with a user borne device used to interact with the electronic drawing application, or even using another modality such as a computer mouse to change the menu option. These interaction approaches are cumbersome when engaging in writing or drawing using an electronic drawing application, for example, and interaction approaches can be further improved.

SUMMARY

According to a first aspect, there is provided an electronic interactive device comprising an interaction surface for use with a user borne device. The interaction surface comprises a contact detection surface configured to detect a contact event of a user borne device with the interaction surface. The electronic interactive device comprises a plurality of magnetometers defining a reference coordinate system of the interaction surface. Each magnetometer of the plurality of magnetometers has a rigid spatial relationship to the other magnetometers. The plurality of magnetometers define a sensing volume proximate to the interaction surface.

The electronic interactive device comprises processing circuitry communicably coupled to at least the contact detection surface and the plurality of magnetometers. The plurality of magnetometers is configured to perform magnetic field measurements of a magnet coupled to a user borne device proximate to the interaction surface, and to provide magnetic field measurement data characterizing the magnetic field measurements to the processing circuitry.

The processing circuitry is configured to determine at least one position and/or orientation of the magnet relative to a longitudinal axis of the user borne device.

The processing circuitry is configured to determine a distance separating the magnet and/or an orientation of the magnet relative to a longitudinal axis of the user borne device from the interaction surface when the contact event occurs.

A user borne device does not need to contain electronic circuitry in order to facilitate the simple change of drawing modes by user. This is because the location of one or more rearrangeable magnets detected by a plurality of magnetometers of an electronic interactive interface can be ascertained during a contact event of the user borne device with the electronic interactive interface. In examples, a number of user borne devices comprising fixed magnets at different positions and/or orientation can be used in combination with the electronic interactive interface, and the electronic interactive interface is able to distinguish which user borne device has been chosen by a user, also by measuring the location of one or more fixed magnets detected by the plurality of magnetometers of an electronic interactive interface during a contact event of the user borne device with the electronic interactive interface. This enables a user to combine the benefits of multiple digital writing instruments into one via the use of a passive user borne device that encloses at least one permanent magnet and an electronic interactive interface that incorporates a plurality of magnetometers and a contact detection surface. This also enables a user to differentiate a larger number of user borne devices by coupling them with different magnets, i.e. having different strength, shape and/or polarity.

The use of user borne device identification entails that multiple users having the same device can be differentiated in real time.

Therefore, the desired identification of a user borne device is achieved by adjusting the resulting field intensity and/or direction of the user borne device is captured by a magnetometer array, even that the moment of contact of a known point of the user borne device (the proximal end) and the target writing surface is always known, and thus the distance from the proximal end of the user borne device to the magnet can be accurately computed.

According to a second aspect, there is provided a computer implemented method comprising:
  performing magnetic field measurements of a magnet coupled to a user borne device proximate to an interaction surface of an electronic interactive device;
  detecting a contact event of a user borne device with the interaction surface, using a contact detection surface comprised in the interaction surface;
  determining at least one position and/or orientation of the magnet relative to a longitudinal axis of the user borne device; and
  determining a distance separating the magnet from the interaction surface when the contact event occurs.

According to a third aspect, there is provided an electronic interactive device according to the first aspect, or its embodiments, and a user borne device comprising a magnet configured to be linearly translatable along, or rotatably around, a longitudinal axis of the user borne device.

According to a fourth aspect, there is provided a computer program element comprising machine readable instructions which, when performed by processing circuitry, are configured to perform the computer implemented method of the second aspect, or its embodiments.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

FIG. 3 schematically illustrates a rotatable magnet of a user borne device.

FIG. 4 schematically illustrates a linearly translatable magnet of a user borne device.

FIG. 5 schematically illustrates a contact event associated with an electronic interactive device.

DETAILED DESCRIPTION

Figure 1:
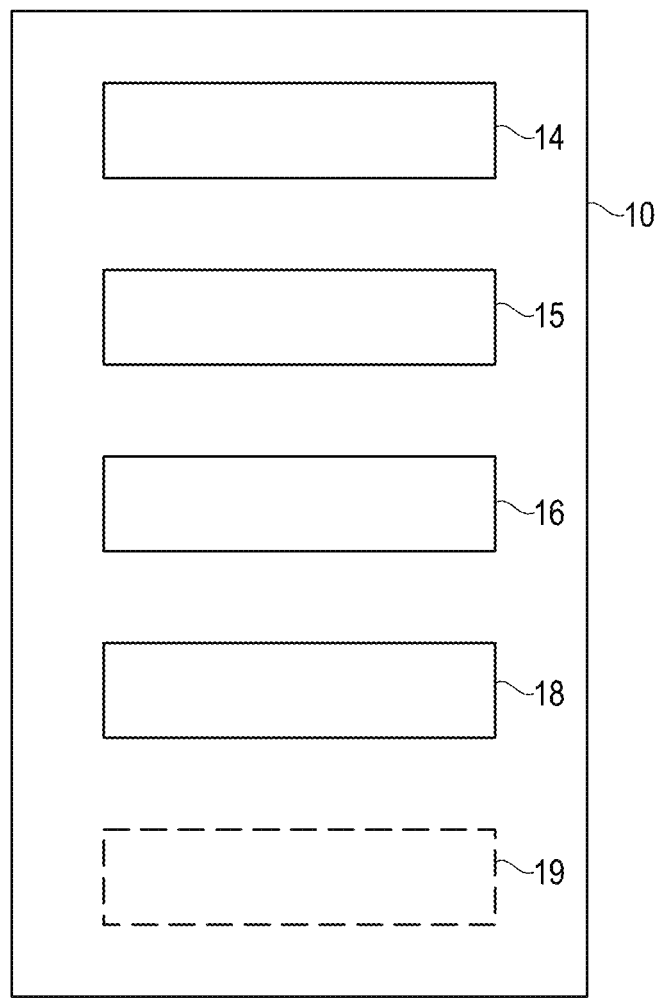
FIG. 1 schematically illustrates a system diagram of an electronic interactive device.

In the case of a physical writing instrument for writing physical paper, a user can select different colours of a pen (in the case of a selectable multicolour pen). In examples, a user can pick up a different pen having a different nib or colour characteristic This description concerns how to facilitate simpler pen characteristic selection in the case of electronic drawing and writing interfaces.

In brief, the specification concerns a solution in which an electronic interactive device 10 is used with one or more user borne devices 50. In examples, a single user borne device 50 comprises at least one magnet capable of being moved between different positions inside the user borne device 50, and the electronic interactive device 10 can detect that the at least one magnet has been moved between different positions inside the user borne device 50. The user can select a use mode of the user borne device 50 (for example a different colour or a different line thickness) by moving the magnet inside the user borne device 50. The electronic interactive device 10 detects that the user borne device 50 is in a specific use mode based on magnetometer measurements of the magnet, and a contact event with the interaction surface 20A of the electronic interactive device 10. In embodiments, the single user borne device may comprise a pluggable element such as a cap comprising, for example, an eraser at its end. When the cap is mounted on the user borne device the distal end D of the cap can be used as an eraser. In these examples, the magnet may be fixed to the body of the user borne device such that the processing circuitry 16 may determine a variation of the distance separating the magnet from the tip of the user borne device when the cap is plugged or unplugged thereby switching between modes, for example a writing mode and an erasing mode, by fitting the cap to the user borne device. In other words, the processing circuitry 16 may be configured to change modes by detecting an increase in length of the user borne device 50 owing to a physical transformation of the user borne device 50. Such a physical transformation is, for example, fitting or removing a pen lid to the user borne device 50.

In examples, a range of variant user borne devices 50 is provided, with each variant user borne device 50 having a unique arrangement of magnets, or single magnets at different positions inside the respective user borne device variant. This makes the variant user borne devices 50 distinguishable by an electronic interactive device 10 comprising a magnetometer array and a contact sensitive interaction surface 20A.

In other words, the user borne device 50 incorporates at least one permanent magnet that can move translationally and/or rotationally with respect to the body of the writing instrument. The data from the contact detection surface characterising a contact event of the user borne device 50 with the contact detection surface is combined with a magnetic field measurement from a magnetometer array. Therefore, the location and/or orientation of the permanent magnet within the user borne device 50 can be used by the electronic interactive interface to identify the type of a virtual writing instrument and/or to be used for adjusting the characteristics of the specific writing instrument type.

FIG. 1 schematically illustrates a system diagram of an electronic interactive device.

According to a first aspect, there is provided an electronic interactive device 10 comprising an interaction surface 20A for use with a user borne device 50, wherein the interaction surface 20A comprises a contact detection surface 20B, 15 configured to detect a contact event of a user borne device 50 with the interaction surface 20A.

The electronic interactive device 10 further comprises a plurality of magnetometers M, 14 defining a reference coordinate system of the interaction surface 20A, wherein each magnetometer M1 of the plurality of magnetometers M has a rigid spatial relationship to the other magnetometers M, and the plurality of magnetometers define a sensing volume S proximate to the interaction surface 20A.

The electronic interactive device 10 further comprises processing circuitry 16 communicably coupled to at least the contact detection surface and the plurality of magnetometers M.

The plurality of magnetometers M is configured to perform magnetic field measurements of a magnet 52 coupled to user borne device 50 proximate to the interaction surface 20A, and to provide magnetic field measurement data characterizing the magnetic field measurements to the processing circuitry 16.

The processing circuitry 16 is configured to determine at least one position and/or orientation of the magnet 52 relative to a longitudinal axis of the user borne device 50. The processing circuitry 16 is configured to determine a distance d0, d1, d2 separating the magnet 52 and/or an orientation of the magnet 52 relative to a longitudinal axis of the user borne device 50 from the interaction surface 20A when the contact event occurs.

In embodiments, the electronic interactive device 10 is one of a smart phone, smart tablet, touch pad, personal computer screen, laptop screen, or electronic whiteboard.

The electronic functional modules comprising the electronic interactive device 10 may be integrated into, or connected to, one or more printed circuit boards or items of printable electronics.

The power source 14 may comprise, for example, a chemical battery such as a lithium ion battery. In examples, a wired power source based on a DC-DC converter can provide the electronic interactive display 10 with electrical power.

In an embodiment, the processing circuitry 16 comprises a data processor or data processing chipset based on an ARM™ or Intel™ processor core or a microcontroller, for example.

Figure 2:
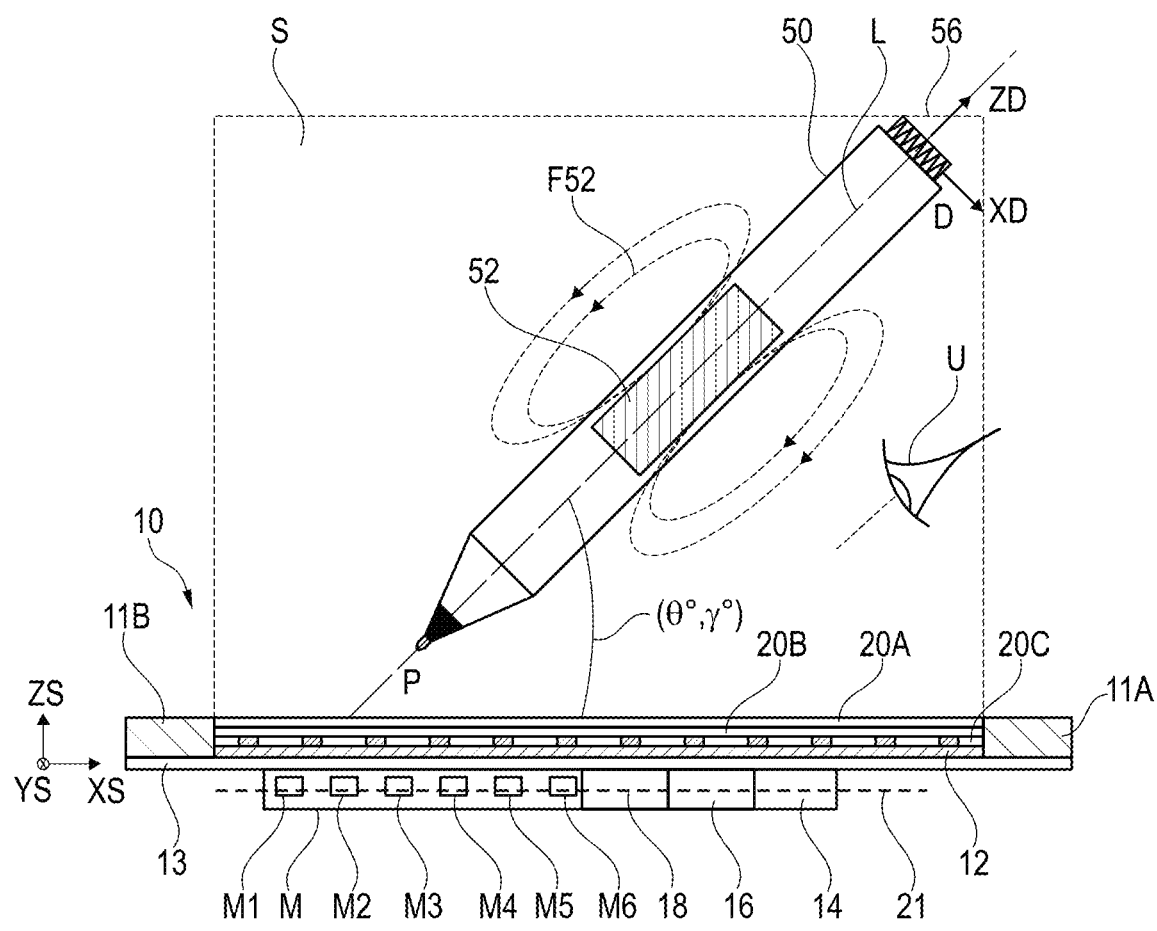
FIG. 2 schematically illustrates a side cut through view of an electronic interactive device in use with an exemplary user borne device.

FIG. 2 schematically illustrates a side cut through view of an electronic interactive device in use with an exemplary user borne device.

An example electronic interactive device 10 is shown in FIG. 2. It comprises a rigid back panel 13 and a frame 11A, 11B. The back panel 13 is, for example, a rigid mechanical support structure made of a solid material for example plastic or metal.

The portion of the electronic interactive device 10 that is visible to a user U, in use, may be referred to as an upper, or front portion. The portion of the electronic interactive display 10 that is not visible to a user, U, in use may be referred to as a lower, or rear portion.

In examples, the frame 11A, 11B can comprise a clear, opaque, or translucent material and laterally encloses (in the illustrated XS, YS plane) an active area in which a user interacts with the interaction surface 20A. The frame 11A, 11B and thus the interaction surface 20A typically have a rectangular planar form. In embodiments, the frame 11A, 11B and the interaction surface 20A can be circular, square, triangular, or an arbitrary shape.

An integrated stack of layers 20A, 20B, 20C comprising the interaction surface and contact detection entails it is mounted on substrate 12. Substrate 12 may be laminated, or glued, for example, to the rear panel 13.

The interaction surface 20A may also define an interaction area of the electronic interactive display 10 with a proximal end P of a user borne device 50. The user manipulates the proximal end P, or tip, of the user borne device 50 within the interaction area to form a drawing or writing artefact which, in embodiments, is digitised by processing circuitry 16 of the electronic interactive device 10.

In the example of FIG. 2, the interaction surface 20A comprises an inert lamination or deposited layer for protecting the underlying layers 20B, 20C from scratches or mechanical damage. Based on a contact detection technology used by the electronic interactive display 10, the interaction surface 20A can also function to detect the location of the proximal end P, or tip, of the user borne device 50 within the interaction area. In other embodiments, the interaction surface 20A may be a purely physical barrier with no localisation function.

In an embodiment, the contact detection technology relies on capacitive detection. In embodiment, the contact detection technology is mutual capacitance. In an embodiment, the contact detection technology is self-capacitance.

In an embodiment, the interaction surface 20A comprising an inert lamination or deposited layer may be omitted, and the contact detection surface 20B also functions as the interaction surface 20A.

In many embodiments, the contact detection surface 20B, 15 is configured to provide (X,Y) coordinates defining the contact point of a tip of a user borne device 50 in the coordinate plane (XS, YS) of the electronic interactive device 10. However the technique outlined in the specification also functions when the contact detection surface 20B, 15 detects a contact event of the tip of a user borne device 50 with the interaction surface 20A. The detection of the contact coordinates is not essential. Thus, the contact detection surface 20B can also be a layer or portion of the electronic interactive device 10 that is mechanically connected to a switch, piezo resistive, piezo electric sensor, or even a microphone that is capable of detecting the contact of the proximal end P of the user borne device 50 with the interaction surface 20A. The FSR element, for example the piezoresistive element, can be addressed by row and column addressing, for example, to detect spatially the pressure. In examples, the pitch is less than 5 mm, in order to perform palm and finger rejection and to specifically detect the pressure exerted by the writing tool.

In examples, the piezoresistive element may be arranged in a matrix of pressure sensitive pixels, addressed by row and column so as to spatially detect pressure. The matrix may have a pitch between pixels that may be lower than e.g. 5 mm in order to perform palm and finger rejection and detect the pressure exerted by the user borne device.

In embodiments where the contact detection technology is based on capacitive detection, the contact detection surface 20B is, in embodiments an optically transparent layer of Indium Tin Oxide (ITO) with an electrode array patterned thereon. In embodiments where the contact detection technology is based on capacitive detection, the tip of the user borne device 50 is, typically, made from a conductive material.

Based on the type of capacitive contact detection technology applied, the capacitive contact detection layer can be provided on the interaction surface 20A, or in other embodiments one or more further contact detection layers can be provided underneath interaction surface 20A (not shown). As is known to a skilled person, the electrodes of the capacitive sense technology can be patterned in a rectangular grid of square pixels, or according to an arbitrary spatial distribution defined by a user application case.

In an embodiment where the contact detection technology is based on force sensitive resistance, the contact detection surface 20B is supplemented by an underlying grid of force sensitive resistance cells 20C, for example. The grid for sensitive resistance cells is capable of localising the contact of a user borne device 50 as an interaction point on the interaction surface 20A in the XS, YS plane, and in embodiments also capturing the pressure exerted by the tip of a user borne device 50. In this case, the interaction surface 20A and the contact detection surface 20B illustrated in FIG. 2 refer pressure exerted on the interaction surface 20A by a tip of the user borne device 50 to the force sensitive resistance cells 20C.

In an embodiment which is not illustrated, the layer stack comprising the interaction surface 20A, and the contact detection surface 20B may comprise, for example, a low-power, reflective display that, through reflection, harnesses ambient light to present content. In an example, the interactive display layer 20B is not an active emitter of light.

In an embodiment which is not illustrated, the layer stack comprising the interaction surface 20A, and the contact detection surface 20B may comprise, for example an OLED, LCD, or TFT display.

The contact detection surface 20B is operably coupled to electronic interface circuitry and interacts, in use, with device driver software executed by processing circuitry 16 of the electronic interactive device 10.

The electronic interactive device 10 further comprises a plurality of magnetometers M, 14. The plurality of magnetometers M enables the electronic interactive device 10 to track a user borne device 50 that comprises a magnet 52 when the user borne device 50 is moved within a sensing volume S of the electronic interactive apparatus 10.

The plurality of magnetometers M may be fixedly arranged in an enclosure of the electronic interactive device 10, which may be joined to the frame 11A/11B. The plurality of magnetometers M define a fixed position and/or orientation with respect to each other. A magnetometer plane 21 may be defined by a plane that extends through a majority of the plurality of magnetometers 300.

More specifically, the magnetometer plane 21 may extend through centres, more specifically geometric centres, of a majority of the plurality of magnetometers M. In other words, most of the magnetometers of the plurality of magnetometers M may be arranged in a common plane, i.e., the magnetometer plane 21. However, one or more magnetometers of the plurality of magnetometers M may be distanced and/or inclined with respect to the common plane, e.g., due to manufacturing issues and/or tolerances and/or manufacturing design constraints. The magnetometer plane M may additionally or alternatively be defined by a plane in which the magnetometers of the plurality of magnetometers M are predominantly arranged.

As indicated in FIG. 2, the electronic interactive device 10 may comprise a reference coordinate system XS, YS, ZS comprising a first reference axis XS, a second reference axis YS and a vertical reference axis ZS. The first reference axis XS and the second reference axis YS may be defined parallel to the magnetometer plane 21 and may be orthogonal to each other. The vertical reference axis ZS may be orthogonal to the magnetometer plane 21. Furthermore, the vertical reference axis ZS may extend through a centre of the plurality of magnetometers M.

Referring to FIG. 2, an arrangement of the plurality of magnetometers M with respect to the contact detection surface 20B is shown. As outlined above, the plurality of magnetometers M is configured to measure a magnetic field associated with a magnet 52 of the user borne device 50. If the user borne device 50 comprises more magnets, then the plurality of magnetometers M can detect them. For example, the plurality of magnetometers M can be configured to detect at least one or two, three, four, five, or more magnets.

The processing circuitry 16 may be configured to determine magnetic field measurement data based on the collected magnetic field measurements within the sensing volume S relative to the reference coordinate system XS, YS, ZS. Magnetic field measurement data may be indicative of a magnetic object position and/or a magnetic object orientation associated with the magnet 52 relative to the reference coordinate system XS, YS, ZS.

The magnetic object orientation may be defined by a set of magnetic object orientation angles ($\theta$, $\gamma$) relative to axes of the reference coordinate system. More specifically, respective magnetic object orientation angles ($\theta$, $\gamma$) may be measured between a magnetic moment vector of the magnet 52 and the respective axes XS, YS, ZS of the reference coordinate system.

As outlined above, each magnetometer of the plurality of magnetometers M may be configured to measure the magnetic field F52 in the direction of the first reference axis XS, the second reference axis YS, and/or the vertical reference axis ZS.

The number of magnetometers provided may depend on the size of the contact detection surface 20B, on which the user-borne device 50 is operated, and/or on the strength of the magnet used in the user borne device 50, and/or on the intended resolution of the contact detection surface 20B.

In the embodiment shown in FIG. 2, the plurality of magnetometers M may be arranged in rows, or rows and columns. In examples, the magnetometers may be arranged surrounding a tracking area. However, it is also possible that the plurality of magnetometers may be arranged in an unordered manner within the electronic interactive device 10. A calibration procedure may be used to determine the exact locations (more specifically, positions and/or orientations) and measurement axes of each magnetometer within the electronic interactive device 10 relative to the reference coordinate system XS, YS, ZS. Furthermore, a sensitivity and/or an offset of each magnetometer may also be calibrated. The plurality of magnetometers M are shown in FIG. 2 as being arranged in the magnetometer plane 21 (i.e., in the same plane relative to the vertical reference axis ZS). However, as outlined above, one or more of the magnetometers may be distanced to the magnetometer plane 21, more specifically distanced in the direction of the vertical reference axis ZS.

Magnetic field measurement data from each magnetometer of the plurality of magnetometers M representing a magnetic field inside the sensing volume S are processed according to the techniques set out in U.S. Pat. No. 9,507,443 B2, for example. U.S. Pat. No. 9,507,443 B2 is incorporated herein by reference. Thereby, the magnetic field measurement data can be used to determine the location and/or orientation of a magnet 52 comprised in the user borne device 50 within the sensing volume S.

The processing required to determine the location of the user borne device 50 relative to the contact detection surface 20B can be performed, for example, by the processing circuitry 16. In embodiments, a separate coprocessor can determine the location of the user borne device 50 relative to the contact detection surface 20B and provides location as an input to the processing circuitry 16.

In an embodiment, the magnetic field measurements of the plurality of magnetometers M are used to localize a proximal P or distal end D of the user borne device 50 to less than 1 mm perpendicular to the surface of the contact detection surface 20B.

In an embodiment, the magnetic field measurements of the plurality of magnetometers M are used to localize a proximal P or distal end D of a user borne within the sensing volume S to no more than 150 mm perpendicular to the surface of the contact detection surface 20B.

In embodiments, the sensing volume S is not a cuboid shape as illustrated, spatial arrangement of the plurality of magnetometers M, and/or signal processing applied to the signals obtained from the plurality of magnetometers M. In an example, each magnetometer of the plurality of magnetometers is a triaxial magnetometer.

In use, the processing circuitry 16 determines the location (position and/or orientation) of the user device 50 by processing the magnetic field measurement data obtained by the plurality of magnetometers M. The processing circuitry 16 can, for example, determine a position and/or orientation of the magnet 52 within the reference coordinate system (XS, YS, ZS). The interaction surface 20A defines the coordinate system reference coordinate system (XS, YS, ZS). Because the plurality of magnetometers M has a fixed, rigid relationship to the electronic interactive device 10, and thus the interaction surface 20A, the processing circuitry 16 is capable of resolving the magnetic moment vector of the magnet 52, and of computing a forward projection of the magnetic moment vector towards the interaction surface 20A (the XS, YS plane).

Furthermore, the processing circuitry 16 is capable of determining an intercept location between the position of the magnet 52 on the interaction surface 20A (XS, YS) plane, which is a 3D location in the sense volume S (XS, YS, ZS). Accordingly, by determining the forward projection of the magnetic moment vector towards the interaction surface 20A at the time point (a contact event) that the proximal end P of the user borne device 50 contacts a point on the interaction surface 20A, the processing circuitry 16 can resolve a distance and/or orientation difference between the proximal end P of a user borne device 50 and the magnet 52. Once the distance between the proximal end P of a user borne device 50 and the magnet 52 has been computed by this method, the processing circuitry can compare the distance to expected ranges of distances, and classify a drawing mode of the user borne device 50 based on the distance or orientation of the magnet 52 relative to the longitudinal axis of the user borne device.

In embodiments, the contact detection surface 20B is configured to output a contact pressure measurement characterising the pressure exerted on the interaction surface during the contact event.

In embodiments, the processing circuitry 16 is configured to detect that the magnet 52 has been rotated by a predefined angle relative to a non-axial rotation vector, wherein the non-axial rotation vector and the longitudinal axis are characterised by a non-zero included angle, and the drawing mode is set based on the detected predefined non-axial rotation angle.

In embodiments, the processing circuitry 16 is configured to detect that the magnet 52 is located at one of a plurality of distances d1, d2, d3 from a proximal nib P of the user borne device 50, and to define the drawing mode based on the determined distance.

In embodiments, the processing circuitry 16 is configured to detect that the magnet 52 is located at one of a plurality of distances d1, d2, d3 from a proximal nib P of the user borne device 50, and to define the drawing mode based on the determined distance.

In embodiments, the processing circuitry is configured to detect that the distance between the proximal nib P of the user borne device and the at least one magnet is less than 0.5 of the total length DT of the user borne device.

In embodiments, the processing circuitry 16 is configured to determine the distance d0, d1, d2 separating the magnet 52 from the interaction surface 20A when the contact event occurs by detecting a position of the magnet 52 on the longitudinal axis of the user borne device 50, relative to the interaction surface 20A. The processing circuitry 16 then computes an intersection of a virtual projection of a magnetic moment vector of the magnet 52 with the interaction surface 20A. The processing circuitry 16 defines a proximal reference point of the longitudinal axis L of the user borne device 50 when the contact event occurs, and computes the distance between the proximal reference point and the position of the magnet 52 on the longitudinal axis of the user borne device 50.

In embodiments, the processing circuitry 16 further comprises non-volatile memory 18 comprising a library of position and/or orientation characteristics of the magnet 52 relative to a plurality of magnet placement distances in the user borne device 50 defining a plurality of drawing modes of the user borne device 50.

The processing circuitry 16 is further configured to identify, using the respective position and/or orientation characteristics of the magnet 52 stored in the library, and the contact event detected by the contact detection surface, that the user borne device 50 is in a drawing mode based on the position and/or orientation of the magnet 52 of the user borne device 50.

In embodiments, the electronic interactive device 10 further comprises a communication device 19, and the processing circuitry is configured to communicate one or more of the drawing mode, the position and/or orientation characteristic of the magnet 52 of the user borne device 50, and/or the coordinates of a contact point of the user borne device on the interaction surface to a host device. For example, the communication device 19 can be a Wi-Fi™ or Bluetooth™ modem, or USB, UART, SPI, I2C, or I3C, for example.

A user borne device 50 for use with a device that incorporates a plurality of magnetometers, can define a longitudinal axis L of the user borne device. The user borne device 50 can comprise a proximal end P and a distal end D. A magnet 52 disposed along at least a portion of the longitudinal axis L of the user borne device 50 in-between the proximal and distal ends is configured to move translationally along, or rotationally about, the longitudinal axis L.

In embodiments, electronic interactive device according to one of the preceding claims, further comprising a display. The processing circuitry is configured to adjust a drawing mode of a software drawing program executed by the processing circuitry based on the at least one position and/or orientation of the magnet of the user borne device.

In embodiments, the processing circuitry is further configured to change a drawing mode of the software drawing program from a first type of drawing mode to a second type of drawing mode in response to detecting a predetermined distance separating the magnet and/or an orientation of the magnet relative to a longitudinal axis of the user borne device from the interaction surface when the contact event occurs.

In embodiments, the drawing mode comprises a thickness, colour, opacity, or line texture.

According to a preferred embodiment, the magnet 52 is located at a separation distance from the proximal end P of the user borne device 50 that is less than half of the total longitudinal dimension of the user borne device 50.

In embodiments, the magnet 52, or a centroid of the magnet 52, is disposed at a portion of the user borne device 50 defined as one or more of a magnet fixed location along the longitudinal axis L. The magnet 52 fixed locations 52A, 52B, 52C etc. are defined as being between 0.1 and 0.2, or between 0.2 and 0.3, or between 0.3 and 0.4, or between 0.4 and 0.5, or between 0.5 and 0.6, or between 0.6 and 0.7, or between 0.7 and 0.8, or between 0.8 and 0.9, or between 0.9 and 0.99, of the total length of the user borne device 50, as measured from the proximal end P.

In embodiments, the distance between each magnet 52 fixed location 52A, 52B, 52C (d0, d1, d2) is, for example, between 0.01 and 0.4 of the total length of the user borne device 50. The magnet 52 can be temporarily moved between different fixed locations inside the user borne device by, for example, a slider mechanism. In examples, a plurality of different user borne devices can be provided with magnets 52 permanently fixed, e.g. glued, at a specific distance along the longitudinal axis L of the respective user borne device 50.

In embodiments, the magnet 52 is adjustable between a first position 52A and a second position 52B along the longitudinal axis of the elongate body 51.

In embodiments, the magnet 52 has a total length in one of the ranges between 0.1 and 0.2, or between 0.2 and 0.3 of the total length of the user borne device 50.

In some examples, the magnet 52 has a total length in one of the ranges between 0.01 and 0.02, or between 0.02 and 0.03, or between 0.03 and 0.04, or between 0.04 and 0.05, or between 0.05 and 0.06, or between 0.06 and 0.07, or between 0.07 and 0.08, or between 0.08 and 0.09, or between 0.1 and 0.2, or between 0.2 and 0.3, or between 0.3 and 0.4, or between 0.4 and 0.5, or between 0.5 and 0.6, or between 0.6 and 0.7, or between 0.7 and 0.8, or between 0.8 and 0.9, of the total length of the elongate body 51.

In embodiments, the total distance DT of the user borne device 50 between the proximal end and the distal end is greater than 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm, 130 mm, 135 mm, 140 mm, 145 mm, 150 mm, 155 mm, 160 mm, 165 mm, 170 mm, 175 mm, 180 mm, 185 mm, 190 mm, 195 mm, or 200 mm.

In embodiments, the magnet 52 is configured to be detectable by a plurality of magnetometers M that together generate a sensing volume S proximate to an electronic interactive device 10, in use.

In embodiments, a magnetic axis (or moment) of the magnet 52 is substantially aligned with a longitudinal axis L of the magnet 52.

In embodiments, the magnet 52 has a magnetic moment in one of the following magnitude ranges: less than 0.1 Am2, or between 0.1-0.3 Am2, 0.3-0.6 Am2, 0.6-0.9 Am2, 0.9-1.2 Am2, 1.2-1.5 Am2, 1.5-1.8 Am2, 1.8-2.1 Am2, 2.1-2.4 Am2, 2.4-2.7 Am2, 2.7-3.0 Am2, 3.0-3.3 Am2, 3.3-3.6 Am2, 3.6-3.9 Am2, 3.9-4.2 Am2, 4.2-4.5 Am2, 4.5-4.8 Am2, 4.8-5.1 Am2, 5.1-5.4 Am2, 5.4-5.7 Am2, 5.7-6.0 Am2, 6.0-6.3 Am2, 6.3-6.6 Am2, 6.6-6.9 Am2, 6.9-7.2 Am2, 7.2-7.5 Am2, 7.5-7.8 Am2, 7.8-8.1 Am2, 8.1-8.4 Am2, 8.4-8.7 Am2, 8.7-9.0 Am2, 9.0-9.3 Am2, 9.3-9.6 Am2, 9.6-9.9 Am2.

In embodiments, the magnet 52 is configurable such that the polar orientation of the magnet 52 encloses a nonzero angle relative to the longitudinal axis L of the user borne device 50. This configuration can be provided by, for example, a gimballing mechanism.

In embodiments, the magnet 52, is a permanent magnet, comprising, for example, neodymium or ferrite.

In embodiments, the magnet 52 is a cylinder magnet or ring magnet.

In embodiments, the magnet 52 is entirely enclosed inside the user borne device 50.

In embodiments, the magnet 52 is movable inside the user borne device 50.

In embodiments, the magnet 52 is entirely enclosed movable inside the user borne device 50.

FIG. 3 schematically illustrates a rotatable magnet of a user borne device. The magnet 52 is rotatable about the longitudinal axis L of the user borne device 50 such that the polar orientation of the magnet 52 θ encloses a non zero angle θ1-θ relative to the longitudinal axis L of the user borne device.

FIG. 4 schematically illustrates a linearly translatable magnet of a user borne device.

The magnet 52 is linearly translatable along the longitudinal axis L of the user borne device 50. In the first magnet fixation position 52A, the linear distance do exists between the proximal end or tip P of the elongate body 51 of the user borne device 50 and the first magnet fixation position 52A. In the second magnet fixation position 52B, the magnet 52 is fixed a linear distance d1+d0 from the proximal end or tip P of the elongate body 51 of the user borne device 50. In the third magnet fixation position 52C, the magnet 52 is fixed a linear distance d2+d1+d0 from the proximal end or tip P of the elongate body 51 of the user borne device 50. Of course, a user borne device 50 may comprise fewer or more magnet fixation positions. Magnetic fields defined when a magnet is positioned at each of the magnet fixation positions (and/or orientations) are detectable by the plurality of magnetometers M and can be used by the processing circuitry 16 to determine a drawing mode of the user borne device 50.

FIG. 5 schematically illustrates a contact event associated with an electronic interactive device.

In embodiments, the contact detection surface (20B) comprises a capacitive sensing arrangement.

In embodiments, the contact detection surface 20B comprises a force sensing resistor arrangement.

For example, during a typical contact event, the proximal end P of the elongate body 51 comprised in the user borne device 50 is brought into contact, by a user, with an interaction surface 20A. In this case, the magnet 52 is set in the first magnet fixation position 52A, and thus a distance do between the proximal end P of the elongate body 51 and the interaction surface 20A can be detected by the processing circuitry 16. At the time of contact defined by the contact event, a contact force F can be detected by a force sensing resistor array (in the case that force sensing resistor array is used). The detection of the contact force F triggers the contact event, which in turn triggers the computation of the projection towards the interaction surface 20A from the location of the magnet 52 detected by the magnetometers M.

In embodiments, a filter may be applied to the FSR measurements to prevent spurious screen contacts being registered as contact events of the user borne device 50 with the interaction surface 20A.

In embodiments, the processing circuitry 16 is configured to calibrate the FSR array at startup, or during use, when the user borne device is not in contact with the FSR array. In particular, the calibration generates correction coefficients to correct at least the effect of one or more of mechanical, temperature, or atmospheric pressure constraints of the FSR array.

Embodiments, the translational and/or rotational movement of the magnet 52 is a quantised or segmented by the processing circuitry 16 into increments that ensure that the magnetic field modification is a significant amount that can be identified by the system.

Figure 6:
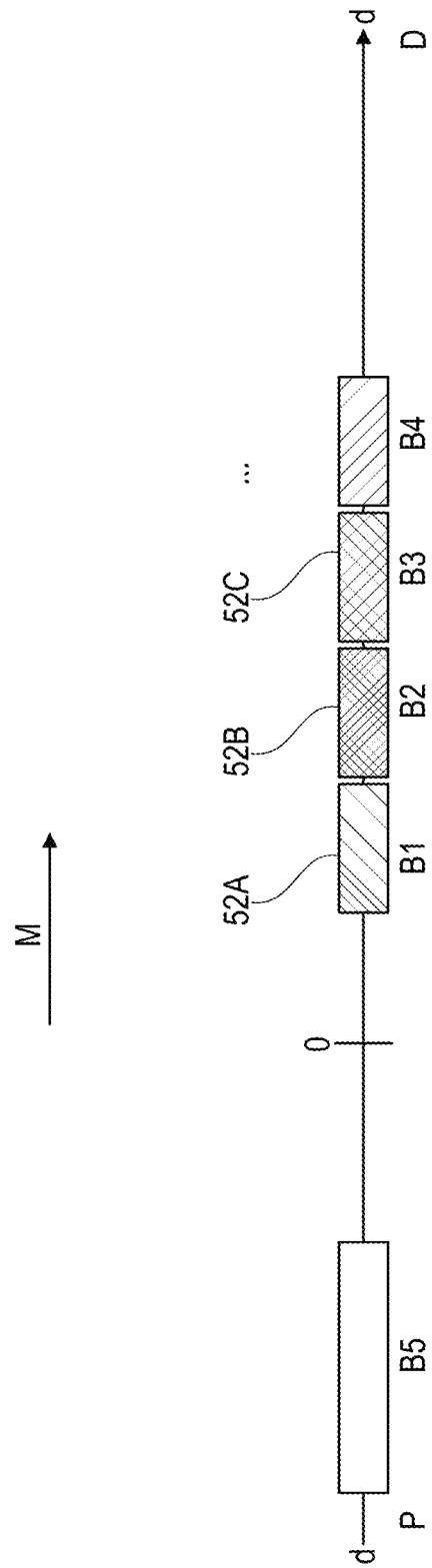
FIG. 6 schematically illustrates mode switching.

FIG. 6 schematically illustrates mode switching.

For example, the "d" axis illustrates the relative distance of the centroid of magnet 52 along the longitudinal axis L of the user borne device 50. In this case, the zero of the relative distance axis is not positioned at the proximal end (tip) of the user borne device 50 but instead allows a "positive" and "negative" distance setting. This enables four modes B1-B4 be selected by progressively moving and fixing the centroid of magnet 52 along the longitudinal axis L in the positive d direction, and enables a B5 drawing mode to be selected by moving the centroid of magnet 52 along the longitudinal axis L in the negative direction.

Figure 7:
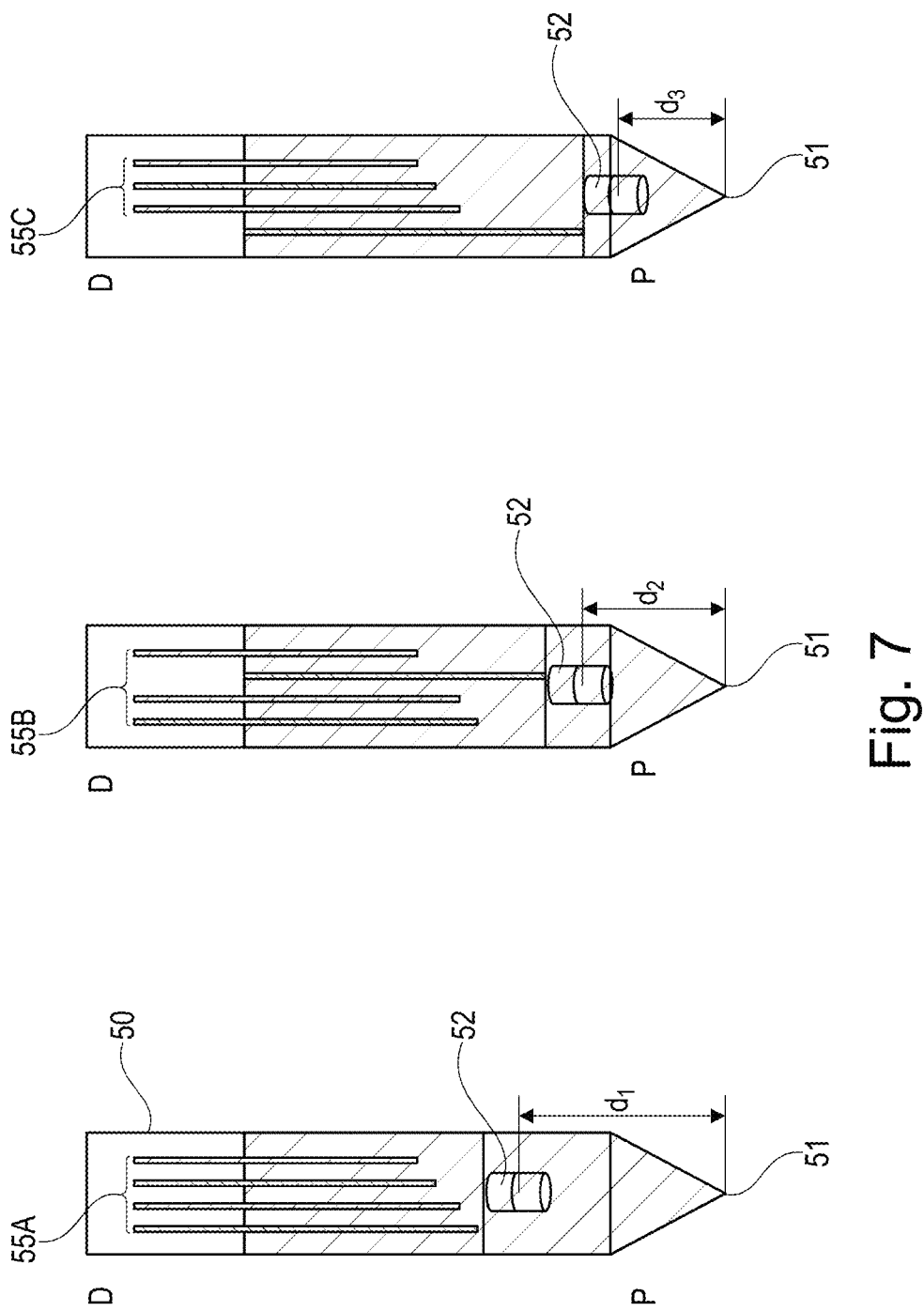
FIG. 7 schematically illustrates an exemplary user borne device switching between three modes.

FIG. 7 schematically illustrates an exemplary user borne device switching between three modes.

In embodiments, the writing instrument can be of the form of a multifunctional writing instrument such as the such as the "BIC4COLOR" ™. For example, the existing mechanism of the "BIC4COLOR" can be used to move and/or rotate the permanent magnet 52 in four different predefined locations or states correlated to a different type of virtual pen or pen characteristic.

For example, in some embodiments the magnetic detection arrangement can be fitted to an existing selectable multicolour pen. In FIG. 7, four ink reservoirs can be set in unique combinations using a user selectable mechanism. A magnet 52 is fixed to the mechanism so that for each of the four settings of the user selectable mechanism, the magnet 52 is positioned at a different fixed location in the usable device 50, such that the current colour setting of the user selectable mechanism can be determined by an arrangement of magnetometers and an associated interaction surface 20A.

Figure 8:
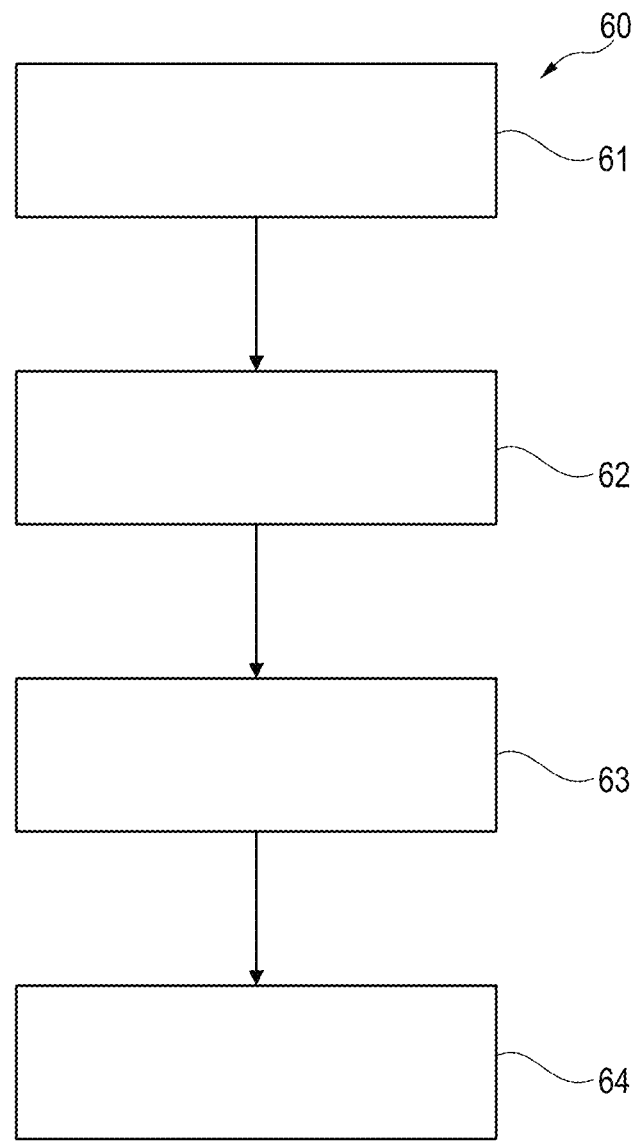
FIG. 8 schematically illustrates a computer implemented method according to the second aspect.

FIG. 8 schematically illustrates a computer implemented method according to the second aspect.

According to a second embodiment, there is provided a computer implemented method 60 comprising:
performing 61 magnetic field measurements of a magnet 52 coupled to a user borne device 50 proximate to an interaction surface (20A) of an electronic interactive device;
detecting 62 a contact event of a user borne device 50 with the interaction surface 20A, using a contact detection surface comprised in the interaction surface 20A;
determining 63 at least one position and/or orientation of the magnet 52 relative to a longitudinal axis of the user borne device 50; and
determining 64 a distance separating the magnet 52 from the interaction surface 20A when the contact event occurs.

In embodiments, the method, further comprises:
determining the distance d0, d1, d2 separating the magnet 52 from the interaction surface 20A when the contact event occurs by:
detecting a position of the magnet 52 on the longitudinal axis of the user borne device 50, relative to the interaction surface 20A;
computing an intersection of a virtual projection of a magnetic moment vector of the magnet 52 with the interaction surface 20A;
defining a proximal reference point of the longitudinal axis of the user borne device 50 when the contact event occurs; and
computing the distance between the proximal reference point and the position of the magnet 52 on the longitudinal axis of the user borne device 50.

The computer implemented method may be implemented, for example, using firmware or software executed by a processor comprised within processing circuitry 16 of an electronic interactive device 10.

Figure 9:
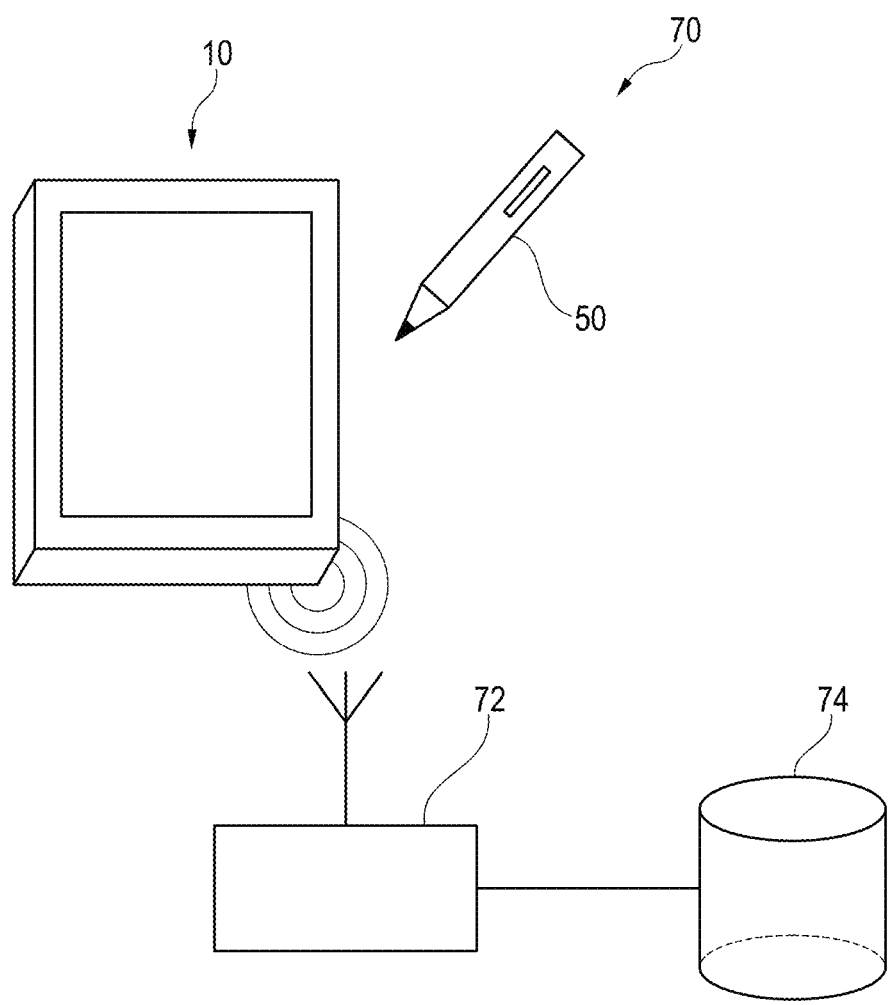
FIG. 9 schematically illustrates a system according to the third aspect.

FIG. 9 schematically illustrates a system according to the third aspect.

According to a third aspect, a system 70 comprises an electronic interactive device 10 according to the first aspect, or its embodiments, and a user borne device comprising a magnet configured to be linearly translatable along, or rotatably around, a longitudinal axis of the user borne device.

In embodiments, the system comprises a host device 74 configured to receive the distance separating the magnet 52 and/or an orientation determined by the processing circuitry 16 of the electronic interactive device. The system further comprises a communications network 72 configured to communicably couple the electronic interactive device 10 with the host device 74. For example, a communications interface of the electronic interactive device 10 can communicatively couple the electronic interactive device 10 to a software as a service (SaaS) computer drawing suite hosted by the host device 72. In an embodiment, the host device 72 is a server or a cloud computing service. Drawings and/or text entered onto the electronic interactive device 10 by the user borne device 50 can be communicated to a host device 72 via the network 72. As noted above, the communications elements can be one, or more, of I2C, I3C, SPI, USB, or Bluetooth™ such as Bluetooth Low Energy™, or Wi-Fi™.

According to a fourth aspect, there is provided a computer program element comprising machine readable instructions which, when performed by processing circuitry 16, are configured to perform the computer implemented method according to the second aspect.

In the preceding specification, numerous specific details are set forth in order to provide a thorough understanding. It will be apparent, however, to one having ordinary skill in the art that the specific detail need not be employed to practice the present disclosure. In other instances, well-known materials or methods have not been described in detail in order to avoid obscuring the present disclosure.

Reference throughout the preceding specification to "one embodiment", "an embodiment", "one example" or "an example", "one aspect" or "an aspect" means that a particular feature, structure or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples. Where relevant, dimensions in millimetres in this application are cited to the nearest +−0.01 mm unless otherwise stated.

What is claimed is:

1. An electronic interactive device comprising:
an interaction surface for use with a user borne device, wherein the interaction surface comprises a contact detection surface configured to detect a contact event of a user borne device with the interaction surface;
a plurality of magnetometers defining a reference coordinate system of the interaction surface, wherein each magnetometer of the plurality of magnetometers has a rigid spatial relationship to the other magnetometers, and the plurality of magnetometers defines a sensing volume proximate to the interaction surface;
processing circuitry communicably coupled to at least the contact detection surface and the plurality of magnetometers; and
a magnet coupled to the user borne device proximate to the interaction surface, wherein at least one position and/orientation of the magnet relative to a longitudinal axis of the user borne device corresponds to at least one mode of the user borne device,
wherein the plurality of magnetometers is configured to perform magnetic field measurements of the magnet, and to provide magnetic field measurement data characterizing the magnetic field measurements to the processing circuitry;
wherein the processing circuitry is configured to determine the at least one position and/or orientation of the magnet relative to a longitudinal axis of the user borne device; and wherein the processing circuitry is configured to determine a distance separating the magnet from the interaction surface and/or an orientation of the magnet relative to a longitudinal axis of the user borne device from the interaction surface when the contact event occurs.

2. The electronic interactive device according to claim 1, wherein the processing circuitry is configured to determine the distance separating the magnet from the interaction surface when the contact event occurs by:
detecting a position of the magnet on the longitudinal axis of the user borne device, relative to the interaction surface;
computing an intersection of a virtual projection of a magnetic moment vector of the magnet with the interaction surface;
defining a proximal reference point of the longitudinal axis of the user borne device when the contact event occurs; and
computing the distance between the proximal reference point and the position of the magnet on the longitudinal axis of the user borne device.

3. The electronic interactive device according to claim 1, wherein the processing circuitry further comprises non-volatile memory comprising a library of position and/or orientation characteristics of the magnet relative to a plurality of magnet placement distances in the user borne device defining a plurality of modes of the user borne device; and
wherein the processing circuitry is further configured to identify, using the respective position and/or orientation characteristics of the magnet stored in the library, and the contact event detected by the contact detection surface, that the user borne device is in a specified mode based on the position and/or orientation of the magnet of the user borne device.

4. The electronic interactive device according to claim 1, further comprising:
a communication device,
wherein the processing circuitry is configured to communicate the at least one mode, the position and/or orientation characteristic of the magnet of the user borne device, and/or the coordinates of a contact point of a user borne device on the interaction surface to a host device.

5. The electronic interactive device according to claim 1, wherein the contact detection surface comprises a capacitive sensing arrangement.

6. The electronic interactive device according to claim 1, wherein the contact detection surface comprises a force sense resistor sensing arrangement, and the contact detection surface is configured to output a contact pressure measurement characterising the pressure exerted on the interaction surface during the contact event.

7. The electronic interactive device according to claim 1, wherein the processing circuitry is configured to detect that the magnet is located at one of a plurality of distances from a proximal nib of the user borne device, and to define the at least one mode based on the determined distance.

8. The electronic interactive device according to claim 6, wherein the processing circuitry is configured to detect that the magnet has been rotated by a predefined angle relative to a non-axial rotation vector, wherein the non-axial rotation vector and the longitudinal axis are characterised by a non-zero included angle, and the at least one mode is set based on the detected predefined non-axial rotation angle.

9. The electronic interactive device according to claim 1, further comprising:
a display;
wherein the processing circuitry is configured to adjust a drawing mode of a software drawing program executed by the processing circuitry based on the at least one position and/or orientation of the magnet of the user borne device.

10. The electronic interactive device according to claim 9, wherein the processing circuitry is further configured to change a drawing mode of the software drawing program from a first type of drawing mode to a second type of drawing mode in response to detecting a predetermined distance separating the magnet from the interaction surface and/or an orientation of the magnet relative to a longitudinal axis of the user borne device from the interaction surface when the contact event occurs and/or
where the drawing mode comprises a thickness, colour, opacity, or line texture.

11. The electronic interactive device according to claim 1, wherein the interactive device comprises a rigid back panel and a frame, the plurality of magnetometers being fixedly arranged in an enclosure of the electronic interactive device that is joined to the frame.

12. A computer implemented method comprising:
performing magnetic field measurements of a magnet coupled to a user borne device proximate to an interaction surface of an electronic interactive device;
detecting a contact event of a user borne device with the interaction surface, using a contact detection surface comprised in the interaction surface;
determining at least one position and/or orientation of the magnet relative to a longitudinal axis of the user borne device;
determining a distance separating the magnet from the interaction surface when the contact event occurs; and
determining, by the electronic interaction device, a mode of the user borne device based on the at least one position and/or orientation of the magnet relative to the longitudinal axis of the user borne device.

13. The computer implemented method according to claim 12, further comprising:
determining the distance separating the magnet from the interaction surface when the contact event occurs by:
detecting a position of the magnet on the longitudinal axis of the user borne device, relative to the interaction surface;
computing an intersection of a virtual projection of a magnetic moment vector of the magnet with the interaction surface;
defining a proximal reference point of the longitudinal axis of the user borne device when the contact event occurs; and
computing the distance between the proximal reference point and the position of the magnet on the longitudinal axis of the user borne device.

14. A system comprising:
an electronic interactive device according to claim 1; and
a user borne device comprising a magnet configured to be linearly translatable along, or rotatably around, a longitudinal axis of the user borne device.

15. The system according to claim 14, further comprising:
a host device configured to receive the distance separating the magnet from the interaction surface and/or an orientation determined by the processing circuitry of the electronic interactive device,
a communications network configured to communicably couple the electronic interaction device with the host device.

16. The system according to claim 14, wherein the magnet is linearly translatable between different fixed locations inside the user borne device via a slider mechanism.

17. A non-transitory computer-readable medium storing computer-executable instructions which, when performed by processing circuitry of a system, cause the system to perform operations comprising:
performing magnetic field measurements of a magnet coupled to a user borne device proximate to an interaction surface of an electronic interactive device;
detecting a contact event of a user borne device with the interaction surface, using a contact detection surface comprised in the interaction surface;
determining at least one position and/or orientation of the magnet relative to a longitudinal axis of the user borne device;
determining a distance separating the magnet from the interaction surface when the contact event occurs; and
determining, by the electronic interaction device, a mode of the user borne device based on the at least one position and/or orientation of the magnet relative to the longitudinal axis of the user borne device.

18. The electronic interactive device of claim 1, wherein a mode of the user borne device corresponds to a type of virtual writing instrument or a characteristic of the virtual writing instrument.

19. The electronic interactive device of claim 1, wherein a one mode of the user borne device corresponds to a type of virtual writing instrument or a characteristic of the virtual writing instrument,
wherein the type of virtual writing instrument is chosen from a writing instrument, a drawing instrument, or an erasing instrument, and
wherein the characteristic of the virtual writing instrument is chosen from thickness, color, opacity, or line texture.

20. The computer implemented method of claim 12, wherein the mode of the user borne device identifies a type of virtual writing instrument or adjusts a characteristic of the virtual writing instrument.

* * * * *